United States Patent [19]
Messler et al.

[11] 3,876,313
[45] Apr. 8, 1975

[54] POSITIONING INSTRUMENT

[76] Inventors: Tom R. Messler, 5740 S. 72 East Ave., Tulsa, Okla. 74112; Joseph P. Messler, 4410 E. 46 Pl., Tulsa, Okla. 74135

[22] Filed: Aug. 23, 1973

[21] Appl. No.: 390,780

Related U.S. Application Data

[62] Division of Ser. No. 191,362, Oct. 21, 1971, Pat. No. 3,758,212.

[52] U.S. Cl. .................. 356/255; 356/144; 33/272; 33/277
[51] Int. Cl. .......................................... G02b 27/32
[58] Field of Search ........... 356/138, 142, 143, 144, 356/145, 255; 33/272, 277

[56] References Cited
UNITED STATES PATENTS

| | | | |
|---|---|---|---|
| 526,021 | 9/1894 | Brunton | 356/142 |
| 2,953,060 | 9/1960 | Carbonara | 356/144 |
| 3,758,212 | 9/1973 | Messler et al. | 356/145 |

*Primary Examiner*—Ronald L. Wibert
*Assistant Examiner*—Paul K. Godwin

[57] ABSTRACT

A self-contained, hand-held instrument for determining geographic position in terms of the compass bearing to a first landmark, and the horizontal angle between the bearings to the first and a second landmark, comprises a frame, proximal and distal sighting indices, a first mirror adjacent the distal index and a second mirror rotatable about a vertical and a horizontal axis for presenting an image of the second landmark in the first mirror, the first landmark is sighted over the top of the first mirror. Means are provided to read the angle of the second mirror.

A compass has a casing which is rotatably mounted in the frame. An index and a pointer are mounted on the casing. Mirror means are provided for presenting an image of the compass index and graduations near the area of the first mirror. The compasss pointer is long compared to the radius of the compass graduation circle.

5 Claims, 8 Drawing Figures

FIG. 6

POSITIONING INSTRUMENT

This is a division of application Serial No. 191,362, filed on Oct. 21, 1971, of Tom E. Messler and J. P. Messler for "Hand-Held Optical Triangulation Position-Determining Instrument" now U.S. Pat. No. 3,758,212.

BACKGROUND OF THE INVENTION

1. Field of the Invention

This invention lies in the field of positioning and surveying instruments in general. More specifically, it refers to an instrument which is adapted to determine the angular position of two distant landmarks by the use of mirrors, one of which is rotatable about a vertical axis.

More specifically, it involves a small hand-held self-contained instrument for use by fishermen for determining their position with respect to specific landmarks on shore, so that at some later time they can reoccupy the same position.

2. Description of the Prior Art

There is considerable prior art, in the general surveying area, of instruments for measuring the horizontal angle between two displaced lines of sight and for determining the compass bearing of a given line of sight.

There are also small instruments designed to provide both of these features in a single hand-held device. However, most of these are designed primarily for measuring angles in a horizontal plane and cannot adapt themselves to the measurement of position with a respect to two distant landmarks where said landmarks are not in the same horizontal plane. Furthermore, these prior art instruments are limited in precision due to the very small radius of the compass reading circle.

SUMMARY OF THE INVENTION

The weaknesses and disadvantages of the prior art instruments are overcome and the objectives of this invention are provided, by an instrument in which there is a frame, a sighting means including a first and second vertical index by means of which the instrument can be aligned with a distant landmark, a first and second mirror are provided, the latter being rotatable about a vertical axis. Thus the eye can see simultaneously the first landmark over the top of the first mirror, and an image of the second landmark in the first mirror, both of which can be aligned with the vertical indices. A compass is provided which can be read by means of a third and fourth mirror, the third mirror being positioned closely adjacent to the first mirror so that at a single viewing the eye of the user can see the two distant landmarks in relation to the vertical indices, and the reading of the compass against an index mounted on the compass casing. The second mirror is adapted to be rotated about a horizontal axis so that the two landmarks can be displaced from a horizontal plane in a vertical direction. Means are provided for reading the compass index against the compass circle more precisely than is possible on a small diameter compass circle.

It is a primary object of this invention to provide a simple, inexpensive self-contained unit that will provide information relative to the precise geographic position of the instrument at any time, so that at some future time that position can be reoccupied, based solely on the indications of the line of sight to a first landmark, the angle of a second mirror and the reading of the compass bearing.

These and other objects of the invention and an understanding of the details and principles of the invention will become evident from the following description, taken in conjunction with the appended drawings, in which:

DESCRIPTION OF THE PREFERRED EMBODIMENT

Figure 1:
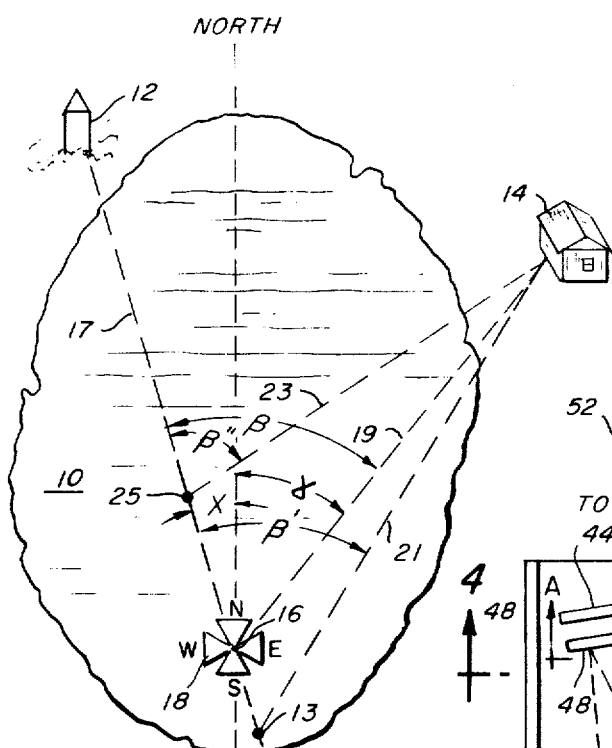
FIG. 1 represents schematically the basis on which the instrument operates, showing the compass bearing to a first landmark and the angle between the compass bearings to a first and a second landmark.

Referring now to the drawings, and in particular to FIG. 1, a schematic diagram is shown in which a body of water 10 is surrounded by land on which there are two landmarks 12 and 14. The instrument is held in a horizontal position at point 16 and the compass bearing of the first landmark 12 is angle $\alpha$ west of north. At the same time, the compass bearing of landmark 14 is $\gamma$ east of north, making the total included angle between the two lines of sight $\beta = \alpha + \gamma$. The geometry of the situation is such that, if at any future time the compass bearing of landmark 12 is $\alpha$ west of north and the included angle between the two lines of sight is $\beta$, then the instrument will be at position 16.

In order to reoccupy point 16 all that is required is to follow a compass course in the direction of landmark 12 at a compass bearing of north $\alpha$ west. At position 13 the angle $\beta'$ between the compass bearing 17 to landmark 12 and the compass bearing 21 to landmark 14 is measured. If this angle $\beta'$ is less than the angle $\beta$ originally measured, it indicates that the position 13 is farther away from landmark 12 than was position 16. On the other hand, consider position 25, where the angle $\beta''$ between the bearing directions 17 and 23 will be larger than the previously measured bearing angle $\beta$. On the basis of whether the bearing angle is measured is greater or less than $\beta$, the user can determine whether he is farther from or closer to the landmark 12 than the original position 16. This illustrates the basis upon which this instrument works.

Figure 3:
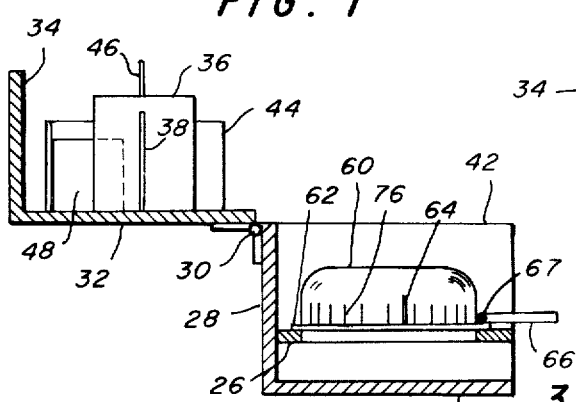
FIG. 3 represents an elevation view of the instrument taken along line 3—3 of FIG. 2.
Figures 2, 2A, 2B:
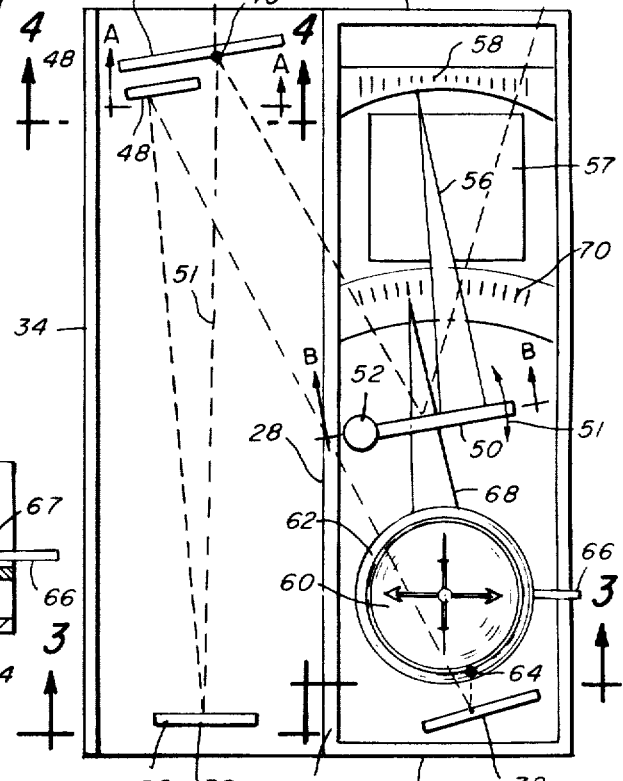
FIG. 2 represents a plan view of the instrument ready for operation.
FIGS. 2A and 2B represent views taken along lines A—A and B—B of FIG. 2.

FIG. 2 shows a plan view of the instrument ready for use, while FIG. 3 shows an elevation view taken from the eye end of the instrument. In general, the instrument comprises a box having a left side wall 28, a bottom 24, a hinged top 32 attached to the side wall 28, and another side wall 34, which is fastened to the top, so that when the top is folded over, or hingedly rotated clockwise, the entire instrument will be enclosed in the top, bottom, and two sides. There are also two ends, 40 the eye and 42 the distal end, which are mounted to the bottom portion. For convenience, the instrument will be described in terms of a "left portion" of the instrument comprising the parts which are mounted on the top, and a "right portion" of the instrument which are comprised of parts mounted on the bottom or on the intermediate deck 26 spaced up from the bottom. At the eye end 40, of the instrument there is an eye piece 36 comprising a small upright wall with a slot 38 representing vertical index, a circular opening, an eyepiece, or the equivalent. On the distal end of the instrument, corresponding to the end wall 42, in the left portion, is a vertical wire 46 or the equivalent, representing a second alignment vertical index. Sighting between the index 38 and the index 46, the instrument can be precisely aligned between the eye of the user and the selected distant landmark.

There is a rectangular mirror 44 mounted on the top plate adjacent the distal index 46. There is also a smaller mirror 48 which is mounted to the top plate in the lower left-hand corner of the mirror 48, but at a different angle. The index 46 preferably can extend up above the top of the mirror 48 so that in sighting a distant landmark the landmark is positioned above the top of the mirror in relation to the vertical index.

There is a second mirror 50 which is attached to a vertical rod 52 which is journaled in the deck 26 and the base 24 of the right portion of the instrument (FIG. 2B) so that the mirror can be rotated according to the arrow 51 in a direction around the axis 52. This mirror carries a long pointer 56 or the equivalent which can be read against a circle and index lines 58.

Also, means are provided for positioning a sheet of paper or a card 57 so that for each angle of the mirror 50 a line can be drawn on the card corresponding to the edge of the pointer 56. In this way, at some future time, the mirror 50 can easily be repositioned to that precise angle. By looking through the index 38 against the first mirror 44, the line of sight is directed to the mirror 50 and off the mirror 50 in accordance with beam 53 to the distant object or landmark 14.

The observer sees in the mirror 44 an image of the landmark 14. By adjusting the angle of the mirror 50 the region around the landmark 14 can be swept and the landmark positioned precisely with respect to the index 46 at the same time that the distant landmark 12 is sighted, with respect to the index 46, over the top of the mirror 44. The angle read against the circle 58 of the pointer 56 is a measure of the angle between the sightlines 51 to the landmark 12, and 53 to the landmark 14. By resetting to that same angle at any future time from that same position 16, the two images should be lined up precisely against the index 46.

In FIG. 2B is shown the mirror 50, the vertical axis 52, and a horizontal axis 54 attached permanently to the vertical axis 52, and about which the mirror 50 is adapted to rotate. Thus, if the landmark 14 is not in the same horizontal plane as the landmark 12, it is possible by adjusting this vertical angle of the mirror 50 to bring the two landmarks into juxtaposition as described above.

There is a compass 60 mounted so that the compass casing 62 is free to turn in a opening in the deck 26. There is an index line 64 mounted on the casing of the compass, against which the compass graduations 76 can be read. There is also a handle 66 hingedly mounted on the casing at hinge 67, so that it can be rotated inward when not in use and turned outward for operation. The handle 66 now permits the operator to rotate the casing of the compass so that the index 64 is precisely aligned with one of the graduations on the compass circle. There is a pointer 68 fastened to the compass casing, which is mounted below the deck 26, and a circle with angle marks 70 against which the pointer can be read. One angle mark represents a zero angle. The pointer would be on this mark when the index 64 lies opposite a graduation on the compass circle. If a compass graduation deviates from the index 64 by a fraction of a space between graduations (which on a small compass circle might be as large as 15°) it become necessary to estimate the angle by interpolating the position of the index 64 between the two adjacent compass graduations.

However, by turning the compass case so that the index 64 falls directly on one, or the other, of the adjacent graduation marks on the compass circle the pointer will deviate from the zero mark on the circle 70, to an adjacent one. Since the diameter of the circle 70 can be several times as large as the diameter of the compass circle, the indices can be put closer together and will represent smaller angles, such as even one degree. Thus, interpolation is not required and compass bearings can be read more precisely.

This feature of expanding the diameter of the compass circle for purposes of higher precision in reading bearing angles is an important feature of this invention.

The third mirror 48 cooperates with a fourth mirror 72 positioned near the compass so that an image of the compass circle with its graduations and the index 64 can be seen in mirror 48 adjacent the mirror 44. FIG. 2A shows an elevation view of the mirrors 44 and 48 and index 46, taken along line A—A of FIG. 2.

Figure 4:
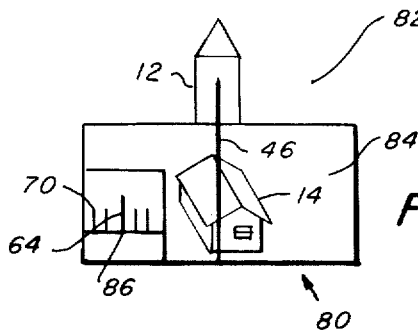
FIG. 4 is a representation of the field of view exposed to the user containing an object space, an image space, a vertical direction reference, and a view of the compass, taken along line 4—4 of FIG. 2.

Reference is now made to FIG. 4 wherein the numeral 80 represents the field of view of the instrument as seen from the sighting index 38. The upper portion 82 of the field is clear space, in which the distant landmark 12 is seen. The line 46 represents the forward distal index 46. The lower half of the field of view indicated by numeral 84 is an image of the landmark 14. The small area marked 86 is an image formed by mirror 72, of the compass circle and the index 64.

This instrument permits an operator to adjust the angle of view in such a way that he can simultaneously view a first landmark and a second landmark against a common index, and also simultaneously view the compass circle graduation against a fixed index, indicating the compass bearing to the first landmark.

After the instrument has been used, the cover is rotated clockwise, so that parts 36, 48, 44 and 46 are enclosed in the right portion, and the entire instrument is enclosed.

Figures 5, 6:
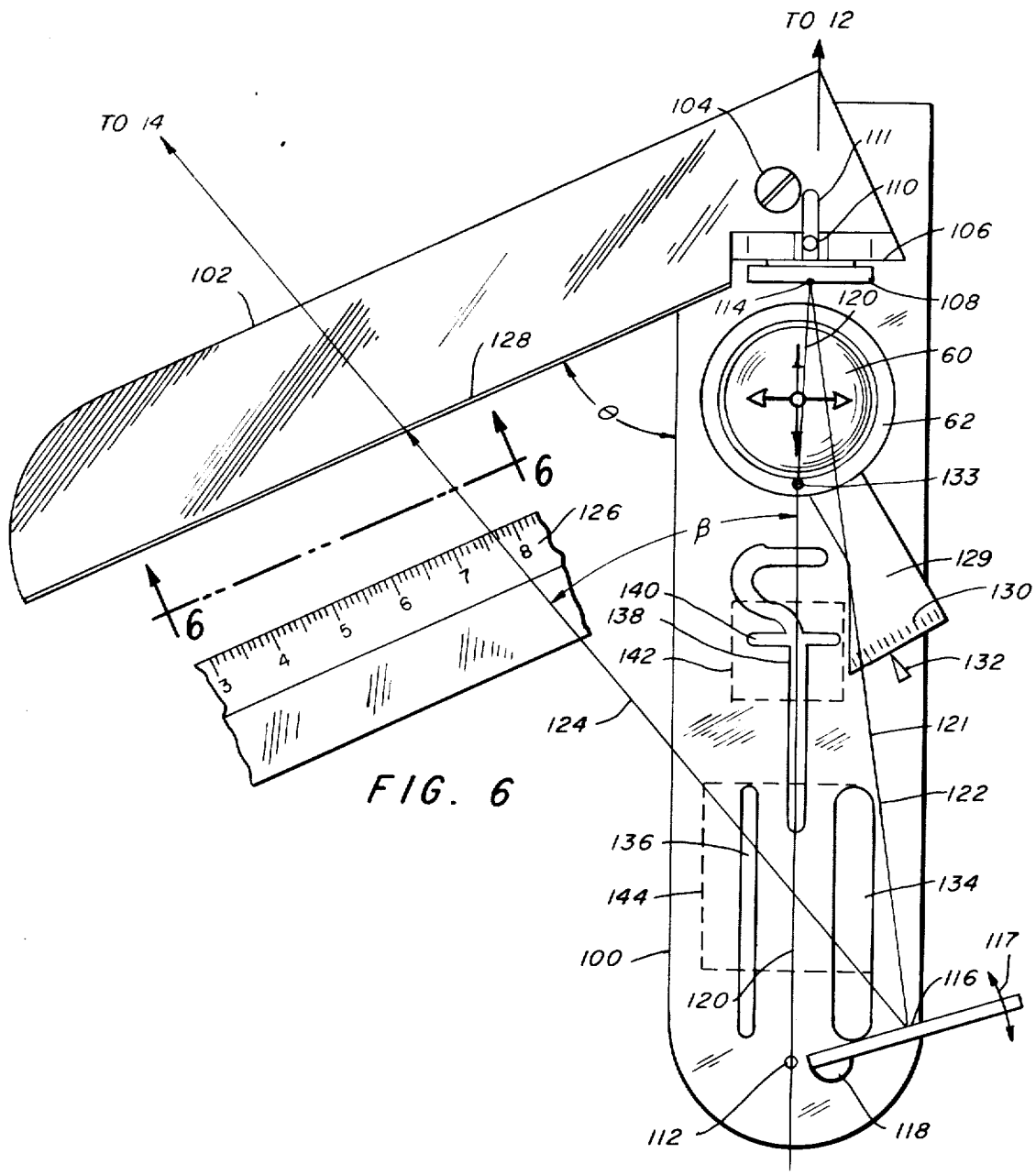
FIG. 5 shows a second embodiment of the instrument.
FIG. 6 is a view taken along line 6—6 of FIG. 5.

Shown in FIG. 5 is a second embodiment of this invention. It comprises a base portion 100 and a top portion or arm 102 which can be conveniently molded in plastic or similar material. The arm 102 is pivoted about the base portion by means of a screw 104, tying the two parts together. There is a drilled hole 110 that goes through the arm and the base portion, by means of which a rod 111 can be pressed into the drilled opening to lock the arm and the base precisely to a selected angle A slender rod or wire 112 is fitted into a drilled hole, at the eye end of the base portion. A mirror 108 is fastened to a bracket which is held in position by the rod 111 as it is pressed into the drilled hole 110. This mirror has a thin scribed line 114, which serves as an index line, so that by lining up the sight from rod 112 to line 114 the instrument can be sighted to a distant landmark 12 as seen over the top of the mirror 108. At the same time the line of sight 120 from the rod 112 goes to the scribed index line 114 on mirror 108 and is reflected back as line 121 to a second mirror 116 from which it is reflected as line 124 to landmark 14. The mirror 116 is mounted on a vertical rod 118, which fits into a drilled hole in the base, in such a manner that the mirror 116 can be rotated in the direction of the arrow 117.

By rotating the mirror 116 to the position shown, the line of sight goes from mirror 108 to mirror 116 and to landmark 14 along line of sights 124. The landmark 14 can be sighted just over the top of the arm 102. Thus, at one time, the observer can sight the landmark 12 over the scribe line 114 and at the same time see the landmark 14 in the field of view of mirror 108.

As the line of sight 124 crosses over the arm 102, the scale 126, which is mounted on the edge 128, of the arm 102 is also visible, and the graduations can be read. Each of the numbered graduations is indicative of a specific angle β between the line of sight 120 to landmark 12, and the line of sight 124 to landmark 14.

By the means so far described, the operator is able to measure the horizontal angle between the lines of sight, or compass bearings, between two landmarks 12 and 14. There is a compass 60 with casing 62 positioned in a circular opening in the base 100 and mounted so that its casing 62 can be rotated. Attached to the case is a member 129 having a circle 130 and index 132 by means of which the case angle can be measured relative to an index or lubber line 133 against which the compass graduations can be read. This is provided, as in the case of FIG. 2, to avoid having to interpolate between the widely spaced graduations of the compass, which may be one for each 15°, for example, as in the case of the instrument of FIG. 2. It is possible to rotate the casing 62 until the lubber line 133 falls directly on one of the graduations, and by noting the reading on scale 130, opposite the index 132 it is possible to read the precise angular bearing of the compass in relation to the sightline to landmark 12.

There are four depressions in the top surface of the base portion, 134, 136, 138 and 140. These hold respectively shaft 118 with the mirror 116 occupying the dashed position 144, the rod 112 which fits into the slender cavity 136, the mirror 108 has a bracket which fits into the slot 140, the mirror itself occupying the space shown by dashed line 142 on top of the base 100, and the rod 111 fits into the curved shape depression 138. Everything is sealed below the surface of the base except the mirror 116, the mirror 108, and the compass. Corresponding clearances are provided in the underside of the arm 102 so that the arm can be rotated until it is directly over the base and by its presence protects and locks in position all of the parts hidden between the base and the arm.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A self-contained, hand-held, position-determining instrument for indicating the position of the instrument in terms of the compass bearing to a first landmark, and the horizontal angle between the bearings to said first and a second landmark, comprising:

a. an elongated frame;
   b. a first vertical index extending upward from the first end of said frame;
   c. a second vertical index extending upward from the second end of said frame;
   d. an arm rotatable about an axis near the second end of said frame;
   e. a graduated scale along said arm and facing toward said first end;
   f. a first vertical mirror on said frame near said second index and facing said first end of said frame;
   g. a second vertical mirror on said frame, facing said first mirror and rotatable about a vertical axis near the first end of said frame;
   h. a compass with a compass case, said case rotatably mounted in said frame forward of said first vertical mirror, means to rotate said case, case index means on said case against which the graduations of the compass can be sighted, pointer means on said case and index means on said frame to determine the angle of said pointer means with respect to said frame.

2. The position-determining instrument as in claim 1 in which said arm is adapted to be rotated so as to cover said frame and protect said instrument.

3. A self-contained, direction determining instrument for indicating the compass direction from said instrument to a selected distant object, comprising:

a. an elongated frame;
   b. means on said frame for determining a line of sight along said frame;
   c. a compass with a compass case positioned on said frame substantially along said line of sight, whereby an operator sighting along said line of sight can simultaneously see said compass and said distant object;
   d. said compass case rotatably mounted in said frame, means to rotate said case, case index means against which the graduations of said compass can be sighted, pointer means on said case, and means to determine the angle of said pointer means with respect to said frame.

4. The instrument as in claim 3 in which said means for determining a line of sight along said frame, comprises, a first vertical index at a first end of said frame, and a second vertical index at the second end of said frame.

5. The instrument as in claim 3 including means to record the direction of said pointer means relative to saaid frame.

* * * * *